(12) United States Patent
Nakamura et al.

(10) Patent No.: US 10,066,112 B2
(45) Date of Patent: Sep. 4, 2018

(54) WHITE INK, INK SET, RECORDING METHOD, INK CONTAINER, AND INKJET RECORDING DEVICE

(71) Applicants: Yuta Nakamura, Kanagawa (JP); Michihiko Namba, Kanagawa (JP); Hiroaki Takahashi, Kanagawa (JP); Hikaru Kobayashi, Kanagawa (JP)

(72) Inventors: Yuta Nakamura, Kanagawa (JP); Michihiko Namba, Kanagawa (JP); Hiroaki Takahashi, Kanagawa (JP); Hikaru Kobayashi, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 15/590,043

(22) Filed: May 9, 2017

(65) Prior Publication Data

US 2017/0335123 A1    Nov. 23, 2017

(30) Foreign Application Priority Data

May 20, 2016    (JP) ................................ 2016-101348
Apr. 4, 2017    (JP) ................................ 2017-074495

(51) Int. Cl.
   *C09D 11/30*    (2014.01)
   *C09D 11/322*    (2014.01)
   (Continued)

(52) U.S. Cl.
   CPC ............... *C09D 11/30* (2013.01); *B41J 2/01* (2013.01); *C09D 11/322* (2013.01);
   (Continued)

(58) Field of Classification Search
   CPC ..... C09D 11/30; C09D 11/322; C09D 11/328; C09D 11/36; C09D 11/38; C09D 11/40; B41J 2/01
   (Continued)

(56) References Cited

U.S. PATENT DOCUMENTS 9,803,093 B2 * 10/2017 Katsuragi .............. C09D 11/40
2008/0182083 A1 * 7/2008 Oyanagi ............. C09D 11/322
                                                  106/31.86
(Continued)

FOREIGN PATENT DOCUMENTS

EP    3 178 890 A1    6/2017
JP    2011-252169    12/2011
(Continued)

OTHER PUBLICATIONS

English translation of JP 2014/172248, Sep. 2014; 34 pages.*
(Continued)

*Primary Examiner* — Helene Klemanski
(74) *Attorney, Agent, or Firm* — Oblon, McClelland, Maier & Neustadt, L.L.P.

(57) ABSTRACT

A white ink containing one or more organic solvents including 40 percent by mass or more of an amide compound of formula 1 is provided:

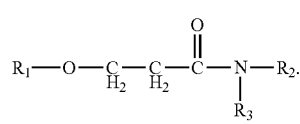

wherein, $R_1$ represents a straight-chained or branch-chained alkyl group having one to six carbon atoms, $R_2$ and $R_3$ each, independently represent hydrogen atoms or straight-chained or branch-chained alkyl groups having 1 to 4 carbon atoms.

18 Claims, 2 Drawing Sheets

(51) Int. Cl.
- *C09D 11/328* (2014.01)
- *C09D 11/36* (2014.01)
- *C09D 11/38* (2014.01)
- *C09D 11/40* (2014.01)
- *B41J 2/01* (2006.01)

(52) U.S. Cl.
CPC ............ *C09D 11/328* (2013.01); *C09D 11/36* (2013.01); *C09D 11/38* (2013.01); *C09D 11/40* (2013.01)

(58) Field of Classification Search
USPC .......................................... 106/31, 43, 31.75
See application file for complete search history.

(56) References Cited

U.S. PATENT DOCUMENTS

| | | | |
|---|---|---|---|
| 2013/0108842 A1* | 5/2013 | Shiono | C09D 11/38 428/195.1 |
| 2015/0035896 A1 | 2/2015 | Gotou et al. | |
| 2015/0259553 A1 | 9/2015 | Nakagawa et al. | |
| 2015/0368492 A1 | 12/2015 | Fujii et al. | |
| 2016/0032122 A1 | 2/2016 | Toda et al. | |
| 2016/0068697 A1 | 3/2016 | Toda et al. | |
| 2016/0102220 A1 | 4/2016 | Kido et al. | |
| 2016/0222234 A1* | 8/2016 | Matsuyama | C09D 11/322 |
| 2016/0264808 A1 | 9/2016 | Kido et al. | |
| 2016/0272834 A1 | 9/2016 | Kobayashi et al. | |
| 2017/0022380 A1 | 1/2017 | Nakagawa et al. | |
| 2017/0051170 A1 | 2/2017 | Nakagawa et al. | |
| 2017/0166764 A1 | 6/2017 | Katsuragi | |
| 2017/0174919 A1 | 6/2017 | Kido et al. | |
| 2017/0355187 A1* | 12/2017 | Hashimoto | B41J 2/04586 |
| 2018/0001669 A1* | 1/2018 | Furukawa | C09D 11/40 |

FOREIGN PATENT DOCUMENTS

| | | |
|---|---|---|
| JP | 2012-188566 | 10/2012 |
| JP | 2013-035993 | 2/2013 |
| JP | 2013-095078 | 5/2013 |
| JP | 2014-172248 | 9/2014 |
| JP | 2014-205767 | 10/2014 |
| JP | 2014-205768 | 10/2014 |
| JP | 2016-030776 | 3/2016 |
| JP | 2016-030788 | 3/2016 |
| JP | 2016-166274 | 9/2016 |
| JP | 2016-169370 | 9/2016 |
| JP | 2017-019972 | 1/2017 |

OTHER PUBLICATIONS

English translation of JP 2017/019972, Jan. 2017; 35 pages.*
English translation of JP 2016/166274, Sep. 2016; 43 pages.*
English translation of JP 2013/035993, Feb. 2013; 18 pages.*
Extended European Search Report dated Aug. 21, 2017 in Patent Application No. 17169895.4.

* cited by examiner

WHITE INK, INK SET, RECORDING METHOD, INK CONTAINER, AND INKJET RECORDING DEVICE

CROSS-REFERENCE TO RELATED APPLICATIONS

This patent application is based on and claims priority pursuant to 35 U.S.C. § 119 to Japanese Patent Application Nos. 2016-101348 and 2017-074495, filed on May 20, 2016 and Apr. 4, 2017, respectively, in the Japan Patent Office, the entire disclosures of which are hereby incorporated by reference herein.

BACKGROUND

Technical Field

The present invention relates to a white ink, an ink set, a recording method, an ink container, and an inkjet recording device.

Description of the Related Art

For industrial use in advertisement and signboards, for example, non-permeable recording media such as plastic film are used in order to improve durability for light, water, abrasion, resistance, etc. Naturally, inks for such non-permeable recording media have been developed.

As such inks, for example, solvent-based inks using organic solvents as solvents and ultraviolet-curable inks mainly constituted of polymerizable monomers have been widely used. However, the solvent ink causes a concern regarding an adverse impact on the environment. The ultraviolet curing ink has a limited choice of polymerizable monomers in terms of safety.

For this reason, ink sets including aqueous inks which are capable of conducting direct recording on non-permeable recording media have been proposed.

Particularly, such non-permeable media are demanded when white images are formed as backdrop on transparent film by an inkjet recording method. As the inkjet recording method, there is a first print method and a second print method. The first print method includes forming a white image on a recording medium with a white ink (first recording process), drying the white image, and thereafter forming a non-white image on the white image with an ink including a non-white ink (second recording process). The second print method includes forming a non-white image on a recording medium with an ink including a non-white ink (first recording process), drying the non-white image, and thereafter forming a white image on the non-white image with a white ink (second recording process).

In general, in the first print method, the surface on which images are formed of the recording medium is the front side as recorded matter. Conversely, the surface on which images are not formed of the recording medium is the front side in the second method.

In either of the inkjet recording methods, the non-white image is required to cause no color bleeding to the white image serving as the backdrop. In either of the first print method or the second print method, as the drying ratio of the ink to be used for forming the image in the first recording process increases in the drying process, color does not easily bleed when the ink is overlapped in the second recording process. However, when trying to obtain a high drying ratio of ink at high temperatures, the drying temperature is constricted by heat resistance of a recording medium. An inexpensive general recording medium having a transparent film-like form such as polyethylene terephthalate (PET) film and polypropylene (PP) film preferably has a drying temperature of around 60 degrees C. or lower in order to prevent distortion caused by heat. For this reason, a long drying time is set between the first recording process and the second recording process.

In order to avoid this color bleeding, typically an ink set including a solvent ink having a fast drying speed or an ink set including a ultraviolet (UV) ink including a resin polymerized upon application of light such as ultraviolet has been used. However, such inks are inferior regarding safety so that an aqueous ink having a low proportion of an organic solvent, which is safer, has been demanded.

As the aqueous ink, for example, an inkjet recording method is proposed which includes a first recording process of recording a white image on a recording medium with a white ink substantially including no alkyl polyol having a boiling point of 280 degrees C. of higher under a pressure corresponding to 1 atm, a drying process of drying the white image with a drying ratio of 40 to 80 percent, and a second recording process of recording a colored image on the white image with a drying ratio of 40 to 80 percent by an inkjet method using a colored ink having a surface tension of 30 mN/m or lower, including a coloring material, and substantially including no alkyl polyol having a boiling point of 280 degrees C. or higher under a pressure corresponding to 1 atm. In this technology, the white ink and the colored ink make an ink set including no alkyl polyol having a boiling point of 280 degrees C. or higher, thereby shortening the drying time of both. However, to achieve the drying ratio of 40 to 80 percent, it is required to set a long drying time.

An aqueous inkjet ink is proposed, which includes at least an organic solvent, a surfactant, and water. The organic solvent includes at least a water-soluble organic solvent A having a boiling pointy of from 100 to 180 degrees C. and a water-soluble organic solvent B having a boiling point of from 200 to 280 degrees C. and a surface tension of from 20 to 30 mN/m and the surfactant is a polysiloxane-based surfactant. It is described in the above-mentioned Japanese Unexamined Patent Application Publication No. 2014-205768 that, due to the aqueous inkjet ink, discharging stability is improved and the ink can be quickly dried by increasing the proportion of the solvent having a low boiling point, in addition, blur of print is suppressed, and high performance is possible.

Such a limited selection to a solvent having a relatively low boiling point is known as a measure to increase the drying speed. However, even such an improved drying speed is not fast enough. Therefore, in order to realize a recording method capable of forming good images at high speed, a white ink is demanded which can suppress color bleeding and have excellent drying property and fixability.

SUMMARY

According to an embodiment of the present invention, provided is an improved white ink which includes one or more organic solvents including an amide compound represented by the following Chemical formula 1, wherein the amide compound accounts for 40 percent by mass or more of the one or more organic solvents,

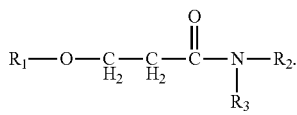

In the chemical formula 1, $R_1$ represents a straight-chained or branch-chained alkyl group having one to six carbon atoms, $R_2$ and $R_3$ each, independently represent hydrogen atoms or straight-chained or branch-chained alkyl groups having 1 to 4 carbon atoms.

BRIEF DESCRIPTION OF THE SEVERAL VIEWS OF THE DRAWINGS

Various other objects, features and attendant advantages of the present invention will be more fully appreciated as the same becomes better understood from the detailed description when considered in connection with the accompanying drawings in which like reference characters designate like corresponding parts throughout and wherein.

DESCRIPTION OF THE EMBODIMENTS

Figure 1:
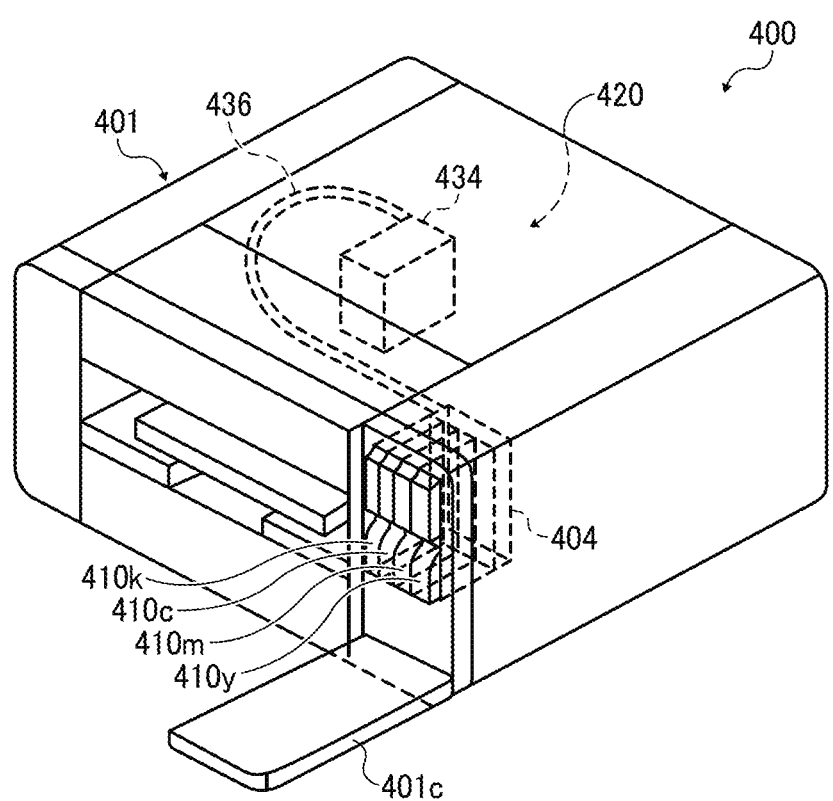
FIG. 1 is a perspective view illustrating a diagram of an example of the inkjet recording device according to an embodiment of the present invention.

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

As used herein, the singular forms "a", "an", and "the" are intended to include the plural forms as well, unless the context clearly indicates otherwise.

Moreover, image forming, recording, printing, modeling, etc. in the present disclosure represent the same meaning, unless otherwise specified.

White Ink and Ink Set

The white ink of the present disclosure includes an organic solvent including an amide compound represented by the following Chemical formula 1, wherein the amide compound accounts for 40 percent by mass or greater and preferably 60 to 80 percent by mass of the organic solvent. The white ink further optionally includes water, a surfactant, a resin particle, and a coloring material.

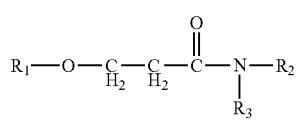

In the Chemical formula 1, $R_1$ represents a straight-chained or branch-chained alkyl group having one to six carbon atoms, and $R_2$ and $R_3$ each, independently represent hydrogen atoms or straight-chained or branch-chained alkyl group having 1 to 4 carbon atoms. The number of carbon atoms of $R_1$ is preferably 1 or 2 and the number of carbon atoms of $R_2$ and $R_3$ is independently preferably 0 to 2. The amide compound represented by the Chemical formula 1 is available on the market and can be synthesized by a known device.

In addition, the ink set of the present disclosure includes at least two inks, the white ink of the present disclosure and a non-white color ink having different color from that of the white ink. The non-white ink preferably includes an amide compound represented by the following Chemical formula 1 like the white ink, and more preferable that the amide compound included in the non-white ink be the same as the amide compound included in the white ink. In addition, in the non-white ink, the amide compound preferably accounts for 40 percent by mass or greater and more preferably from 60 to 80 percent by mass of the entire of the organic solvent. The non-white ink further optionally includes, for example, water, a surfactant, a resin particle, and a coloring material. It is also preferable that these compositions be the same as those of the white ink.

The present inventors have found the following:

When forming an image on a transparent substrate utilizing an inkjet recording method, there is a first print method and a second print method. The first print method includes forming a white image on the transparent substrate with a white ink (first recording process) and thereafter forming a non-white image on the white image with a non-white ink (second recording process). The second print method includes forming a non-white image on the transparent substrate with a non-white ink (first recording process) and thereafter forming a white image on the non-white image with a white ink (second recording process).

According to the recording method in which a white image is formed on a non-white image as with the recording method including the first print method or the second print method, drying property of each ink in the ink set is significantly improved because the amide compound represented by the Chemical formula 1 illustrated above accounts for 40 percent by mass or more of the organic solvent in the white ink and in particular in each ink in the ink set. The mechanism is not clear but film forming property is deduced to be improved due to the usage of the amide compound and a combinational use of the amide compound and the resin particle.

Moreover, since the drying property of the ink to a non-permeable recording medium is improved, it is possible to suppress a phenomenon (beading) such that adjacent ink droplets are united and contracted during high performance after the ink droplets land on the non-permeable recording medium and color bleeding to the backdrop. As a consequence, quality images can be obtained.

The white ink of the present disclosure is excellent to suppress color bleeding in particular in the first print method. In addition, the ink set of the present disclosure is preferable because it is excellent to suppress color bleeding in the first print method and the second print method.

The content ratio (proportion) of the amide compound to the entire organic solvent is preferably 40 percent by mass or more, more preferably from 40 to 80 percent by mass to obtain good discharging stability, and furthermore preferably from 60 to 80 percent by mass to obtain excellent drying property and fixability.

Water

There is no specific limitation to the water and it can be suitably selected to suit to a particular application. For example, deionized water, ultrafiltered water, reverse osmosis water, pure water such as distilled water, and ultra pure water are suitable. These can be used alone or in combination.

The proportion of the water to the entire ink is preferably from 15 to 60 percent by mass and more preferably 20 to 40 percent by mass. When the proportion is 15 percent by mass or more, excessive increase of viscosity can be prevented and discharging stability can be improved. When the proportion is 60 percent by mass or less, wettability to a non-permeable recording medium is suitable, which leads to improvement on the image quality.

The ink of the present disclosure may furthermore optionally include other organic solvents in addition to the amide compound represented by the Chemical formula 1 illustrated above in the organic solvent. Next, those other optional organic solvents are described.

Organic Solvent

There is no specific limitation to the organic solvent for use in the present disclosure. For example, water-soluble organic solvents can be used. Examples are polyols, ethers such as polyol alkylethers and polyol arylethers, nitrogen-containing heterocyclic compounds, amides, amines, and sulfur-containing compounds.

Specific examples of the water-soluble organic solvents include, but are not limited to, polyols such as ethylene glycol, diethylene glycol, 1,2-propanediol, 1,3-propanediol, 1,2-butanediol, 1,3-butanediol, 1,4-butanediol, 2,3-butanediol, 3-methyl-1,3-butane diol, triethylene glycol, polyethylene glycol, polypropylene glycol, 1,2-pentanediol, 1,3-pentanediol, 1,4-pentanediol, 2,4-pentanediol, 1,5-pentanediol, 1,2-hexanediol, 1,6-hexanediol, 1,3-hexanediol, 2,5-hexanediol, 1,5-hexanediol, glycerin, 1,2,6-hexanetriol, 2-ethyl-1,3-hexanediol, ethyl-1,2,4-butane triol, 1,2,3-butanetriol, 2,2,4-trimethyl-1,3-pentanediol, and petriol; polyol alkylethers such as ethylene glycol monoethylether, ethylene glycol monobutylether, diethylene glycol monomethylether, diethylene glycol monoethylether, diethylene glycol monobutylether, tetraethylene glycol monomethylether, and propylene glycol monoethylether; polyol arylethers such as ethylene glycol monophenylether and ethylene glycol monobenzylether; nitrogen-containing heterocyclic compounds such as 2-pyrolidone, N-methyl-2-pyrolidone, N-hydroxyethyl-2-pyrolidone, 1,3-dimethyl-2-imidazolidinone, ε-caprolactam, and γ-butyrolactone; amides such as formamide, N-methylformamide, N,N-dimethylformamide, 3-methoxy-N,N-dimethyl propioneamide, and 3-buthoxy-N,N-dimethyl propioneamide; amines such as monoethanolamine, diethanolamine, and triethylamine; sulfur-containing compounds such as dimethyl sulfoxide, sulfolane, and thiodiethanol; propylene carbonate, and ethylene carbonate.

To serve as a humectant and impart a good drying property, it is preferable to use an organic solvent having a boiling point of 250 degrees C. or lower.

The content ratio (proportion) of the organic solvent is preferably 10 to 60 percent by mass and more preferably 20 to 60 percent by mass to the total content of ink in light of drying property and discharging reliability of the ink.

Surfactant

Examples of the surfactant are silicone-based surfactants, fluorochemical surfactants, amphoteric surfactants, nonionic surfactants, anionic surfactants, etc.

The silicone-based surfactant has no specific limit and can be suitably selected to suit to a particular application.

Of these, preferred are silicone-based surfactants which are not decomposed even in a high pH environment.

Specific examples thereof include, but are not limited to, side-chain-modified polydimethylsiloxane, both-distal-end-modified polydimethylsiloxane, one-distal-end-modified polydimethylsiloxane, and side-chain-both-distal-end-modified polydimethylsiloxane. A silicone-based surfactant having a polyoxyethylene group or a polyoxypropylene group as a modification group is particularly preferable because such an agent demonstrates good characteristics as an aqueous surfactant. It is possible to use a polyether-modified silicone-based surfactant as the silicone-based surfactant. A specific example is a compound in which a polyalkylene oxide structure is introduced into the side chain of the Si site of dimethyl silooxane.

Specific examples of the fluorochemical surfactants include, but are not limited to, perfluoroalkyl sulfonic acid compounds, perfluoroalkyl carboxylic acid compounds, ester compounds of perfluoroalkyl phosphoric acid, adducts of perfluoroalkyl ethylene oxide, and polyoxyalkylene ether polymer compounds having a perfluoroalkyl ether group in its side chain. These are particularly preferable because they do not easily produce foams.

Specific examples of the perfluoroalkyl sulfonic acid compounds include, but are not limited to, perfluoroalkyl sulfonic acid and salts of perfluoroalkyl sulfonic acid.

Specific examples of the perfluoroalkyl carboxylic acid compounds include, but are not limited to, perfluoroalkyl carboxylic acid and salts of perfluoroalkyl carboxylic acid.

Specific examples of the polyoxyalkylene ether polymer compounds having a perfluoroalkyl ether group in its side chain include, but are not limited to, salts of sulfuric acid ester of polyoxyalkylene ether polymer having a perfluoroalkyl ether group in its side chain and salts of polyoxyalkylene ether polymers having a perfluoroalkyl ether group in its side chain. Counter ions of salts in these fluorine-based surfactants are, for example, Li, Na, K, $NH_4$, $NH_3CH_2CH_2OH$, $NH_2(CH_2CH_2OH)_2$, and $NH(CH_2CH_2OH)_3$.

Specific examples of the amphoteric surfactants include, but are not limited to, lauryl aminopropionic acid salts, lauryl dimethyl betaine, stearyl dimethyl betaine, and lauryl dihydroxyethyl betaine.

Specific examples of the nonionic surfactants include, but are not limited to, polyoxyethylene alkyl phenyl ethers, polyoxyethylene alkyl esters, polyoxyethylene alkyl amines, polyoxyethylene alkyl amides, polyoxyethylene propylene block polymers, sorbitan aliphatic acid esters, polyoxyethylene sorbitan aliphatic acid esters, and adducts of acetylene alcohol with ethylene oxides.

Specific examples of the anionic surfactants include, but are not limited to, polyoxyethylene alkyl ether acetates, dodecyl benzene sulfonates, laurates, and polyoxyethylene alkyl ether sulfates.

These can be used alone or in combination.

In order to obtain good discharging stability, it is preferable to select polysiloxane-based surfactants as the surfactant.

Polysiloxane-Based Surfactant

As the polysiloxane-based surfactants, for example, the following is preferable: a compound (silicone-based compound) having a hydrophilic group or a hydrophilic polymer chain in the side chain of a compound having a polysiloxane structure such as polydimethylsiloxane; and a compound having a hydrophilic group or a hydrophilic polymer chain at its distal end of a compound (silicone-based compound) having a polysiloxane structure such as polydimethylsiloxane.

The polysiloxane-based surfactant means a compound having a polysiloxane backbone in its structure.

Examples of the hydrophilic group and the hydrophilic polymer chain include, polyether groups (polyethyleneoxide, polypropylene oxide, and copolymers thereof), polyglycerin $(C_3H_6O(CH_2CH(OH)CH_2O)_n$—H, etc.), pyrolidone, betaine $(C_3H_6N^+(C_2H_4)_2$—$CH_2COO^-$, etc.), sulfates $(C_3H_6O(C_2H_4O)_n$—$SO_3Na$, etc.), phosphates $(C_3H_6O(C_2H_4O)_n$—$P(=O)OHONa$, etc.), and quarternary salts $(C_3H_6N^+(C_2H_4)_3Cl^-$, etc.). In the compounds, n represents an integer of 1 and above. Of these, it is preferable to have a polyether group.

In addition, a vinyl-based copolymer is also preferable which has a silicone-based compound chain such as polydimethylsiloxane in its side chain, which is obtained by copolymerization of a polydimethylsiloxane having a polymerizable vinyl group at its distal end and a copolymerizable monomer (it is preferable to at least partially use a hydrophilic monomer such as a (meth)acrylic acid or its salt in the monomer).

Of these, a compound having a polysiloxane backbone and a hydrophilic polymer chain is preferable. More preferred are compounds having a polyether group as the hydrophilic polymer chain. In addition, a non-ionic surfactant is particularly preferable in which a polysiloxane-based surfactant has methyl polysiloxane as a hydrophobic group and a polyoxyethylene backbone as a hydrophilic group.

The polysiloxane-based surfactant is available on the market.

Specific examples include, but are not limited to, Silface SAG005 (HLB value: 7.0) and Silface SAG008 (HLB value: 7.0), both are manufactured by Nisshin Chemical Co., Ltd., FZ2110 (HLB value: 1.0, FZ2166 (HLB value: 5.8), SH-3772M (HLB value: 6.0), L7001 (HLB value: 7.4), SH-3773M (HLB value: 8.0), all of which are manufactured by Dow Corning Toray Co., Ltd.), KF-945 (HLB value: 4.0), and KF-6017 (HLB value: 4.5), both of which are manufactured by Shin-Etsu Chemical Co., Ltd., and FormBan MS-575 (HLB value: 5.0), manufactured by Ultra Additives Inc.).

The proportion of the surfactant is preferably 0.1 to 5 percent by mass and more preferably 0.5 to 3 percent by mass to the total content of an ink in light of drying property of the ink.

Resin Particle

The kind of the resin particle contained in an ink has no particular limit and can be suitably selected to suit to a particular application.

Specific examples include, but are not limited to, resin particles formed of urethane resins, polyester resins, acrylic-based resins, vinyl acetate-based resins, styrene-based resins, butadiene-based resins, styrene-butadiene-based resins, vinyl chloride-based resins, acrylic styrene-based resins, and acrylic silicone-based resins. It is possible to mix a resin emulsion in which resin particles are dispersed in water serving as a dispersion medium with materials such as a coloring material and an organic solvent to obtain an ink. The resin particle can be suitably synthesized or is available on the market. These can be used alone or in combination.

It is preferable to select polyurethane resin particles as the resin particle to obtain good drying property, high image gloss, and good abrasion resistance of an ink.

Polyurethane Resin Particle

Due to a combinational use of the amide compound and the polyurethane resin particle, chemical resistance can be significantly improved in addition to good drying property, high image gloss, and good abrasion resistance.

As the glass transition temperature (Tg) of the polyurethane resin particle, 0 degrees C. or lower is preferable.

When the glass transition temperature is 0 degrees C. or lower, ink film can be formed at the border between liquid and air even when the evaporation ratio is low. Therefore, the ink film is not easily mixed with an ink discharged onto the ink film, thereby preventing occurrence of color bleeding. In addition, high image gloss is obtained.

In addition, fixing on a substrate such as a recording medium is more steady and adhesion and fixability are improved. Moreover, it is possible to suppress nozzle clogging when ink is discharged from a head. For this reason, the incidence rate of poor discharging can be reduced.

As the polyurethane resin particle, for example, polyether-based polyurethane resin particles, polycarbonate-based polyurethane resin particles, and polyester-based polyurethane resin particles are preferable.

There is no specific limit to the polyurethane resin particle and it can be suitably selected to suit to a particular application. For example, polyurethane resin particle, etc. are suitably used which are obtained by reacting polyol with polyisocyanate.

Polyol

Examples of the polyol are polyether polyols, polycarbonate polyols, and polyester polyols. These can be used alone or in combination.

Polyether Polyol

As the polyether polyol, for example, at least one kind of compounds having two or more active hydrogen atoms is used as a staring material to which an alkyleneoxide is added by polymerization.

Specific examples of the compound including two or more active hydrogen atoms include, but are not limited to, ethylene glycol, diethylene glycol, triethylene glycol, propylene glycol, trimethylene glycol, 1,3-butane diol, 1,4-butane diol, 1,6-hexane diol, glycerin, trimethylol ethane, and trimethylol propane. These can be used alone or in combination.

Specific examples of alkyleneoxide include, but are not limited to, ethylene oxide, propylene oxide, butylene oxide, styrene oxide, epichlorohydrine, and tetrahydrofuran. These can be used alone or in combination.

The polyether polyol has not particular limit and can be suitably selected to suit to a particular application. In order to obtain a binder for ink having extremely excellent abrasion resistance, it is preferable to use polyoxytetra methylene glycol or polyoxypropylene glycol. These can be used alone or in combination.

Polycarbonate Polyol

As polycarbonate polyol for use in manufacturing the urethane resin particle, for example, a product obtained by reacting a carboxylic acid ester with a polyol or a phosgene with bisphenol A. These can be used alone or in combination.

Specific examples of carboxylic acid esters include, but are not limited to, methyl carbonate, dimethyl carbonate, ethyl carbonate, diethyl carbonate, cyclocarbonate, and diphenyl carbonate. These can be used alone or in combination.

Specific examples of the polyol include, but are not limited to, dihydroxy compounds having a relatively low molecular weight such as ethylene glycol, diethylene glycol, triethylene glycol, 1,2-propylene glycol, 1,3-propylene glycol, dipropylene glycol, 1,4-butane diol, 1,3-butane diol, 1,2-butane diol, 2,3-butane diol, 1,5-pentane diol, 1,5-hexane diol, 2,5-hexane diol, 1,6-hexane diol, 1,7-heptane diol, 1,8-octane diol, 1,9-nonane diol, 1,10-decane diol, 1,11-undecane diol, 1,12-dodecane diol, 1,4-cyclohexane diol, 1,4-cyclohexane dimethanol, hydroquinone, resorcin, bisphenol A, bisphenol F, and 4,4'-biphenol, and polyether polyols such as polyethylene glycol, polypropylene glycol, polyoxytetramethylene glycol, and polyester polyols such as polyhexamethylene adipate, polyhexamethylene succinate, and polycaprolactone. These can be used alone or in combination.

Polyester Polyol

As the polyester polyol, for example, it is possible to use a product obtained by esterification reaction between a polyol having a low molecular weight and a polycarboxylic acid, a polyester obtained by a ring-opening polymerization reaction of a cyclic ester compound such as ε-caprolactone, or a coploymerized polyester thereof. These can be used alone or in combination.

Specific examples of the polyol having a low molecular weight include, but are not limited to, ethylene glycol and propylene glycol. These can be used alone or in combination.

Specific examples of the polycarboxylic acid include, but are not limited to, succinic acid, adipic acid, sebacic acid, dodecane dicarboxylic acid, terephthalic acid, isophthalic acid, phthalic acid, and anhydrides or ester forming derivatives thereof. These can be used alone or in combination.

Polyisocyanate

Specific examples of the polyisocyanate include, but are not limited to, aromatic diisocyanates such as phenylene diisocyanate, tolylene diisocyanate, diphenylmethane diisocyanate, and naphthalene diisocyanate and aliphatic or alicyclic diisocyanates such as hexamethylene diisocyanate, lysine diisocyanate, cyclohexane diisocyanate, isophorone diisocyanate, dicyclohexylmethane diisocyanate, xylylene diisocyanate, tetramethyl xylylene diisocyanate, and 2,2,4-trimethyl hexamethylene diisocyanate. These can be used alone or in combination. Of these, using an alicyclic diisocyanate is preferable in terms of extremely high level of weather resistance for a long period of time taking it into account that the ink of the present disclosure is expected to be applied to posters, signboards, etc., for outdoor use.

Furthermore, it is preferable to add at least one kind of alicyclic diisocyanate, thereby easily acquiring a desired layer robustness and abrasion resistance.

Specific examples of the alicyclic diisocyanate include, but are not limited to, isophorone diisocyanate and dicyclohexylmethane diisocyanate.

The content ratio of the alicyclic diisocyanate is preferably 60 percent by mass or greater to the total content of the isocyanate compound.

Method of Manufacturing Polyurethane Resin Particle

The polyurethane resin particle can be manufactured by typical manufacturing methods. For example, the following method is suitable.

First, a urethane prepolymer having an isocyanate group at its distal end is prepared under the presence of no solvent or an organic solvent by the reaction of the polyol and the polyisocyanate with an equivalent ratio in which isocyanate groups are excessive.

Next, optionally the anionic group in the urethane prepolymer having an isocyanate group at its distal end is neutralized by a neutralizer. Thereafter, subsequent to reaction with a chain elongating agent, the organic solvent in the system is removed if desired to obtain the polyester-based urethane resin particle.

Specific examples of the organic solvent for use in manufacturing the polyurethane resin particle include, but are not limited to, ketones such as acetone and methylethyl ketone; ethers such as tetrahydrofuran and dioxane, acetic acid esters such as ethyl acetate and butylacetate, nitriles such as acetonitrile, and amides such as dimethyl formamide, N-methyl pyrolidone, and N-ethyl pyrolidone. These can be used alone or in combination.

Polyamines or other compounds having active hydrogen groups are used as the chain elongating agent.

Specific examples of the polyamine include, but are not limited to, diamines such as ethylene diamine, 1,2-propane diamine, 1,6-hexamethylene diamine, piperazine, 2,5-dimethyl piperazine, isophoronediamine, 4,4'-dicyclohexyl methane diamine, and 1,4-cyclohexane diamine, polyamines such as diethylenetriamine, dipropylene triamine, and triethylene tetramine, hydrazines such as N,N'dimethyl hydrazine and 1,6-hexamethylene bis hydrazine, and dihydrazides such as succinic dihydrazide, adipic acid dihydrazide, glutaric acid dihydrazide, sebacic acid dihydrazide, and isophthalic acid dihydrazide. These can be used alone or in combination.

Specific examples of the compounds having active hydrogen groups include, but are not limited to, glycols such as ethylene glycol, diethylene glycol, triethylene glycol, propylene glycol, 1,3-propane diol, 1,3-butane diol, 1,4-butane diol, hexamethylene glycol, saccharose, methylene glycol, glycerin, and sorbitol; phenols such as bisphenol A, 4,4'-dihydroxydiphenyl, 4,4'-dihydroxydiphenyl ether, 4,4'-dihydroxydiphenyl sulfone, hydrogenated bisphenol A, and hydroquinone, and water. These can be used alone or in combination.

As the polyurethane resin particle, polycarbonate-based polyurethane resin particles are preferable in terms of water resistance, heat resistance, abrasion resistance, wear resistance, and friction resistance of images caused by high agglomeration power of carbonate groups. In the case of polycarbonate-based polyurethane resin particle, obtained ink is suitable for printed matter for use in severe conditions like outdoor use.

The polyurethane resin particle is available on the market. Specific examples include, but are not limited to, WBR-600U (glass transition temperature: −30 degrees C., manufactured by TAISEI FINE CHEMICAL CO., LTD.), JONCRYL® 585 (glass transition temperature: −20 degrees C., manufactured by BASF), SUPERFLEX 300 (glass transition temperature: −42 degrees C., manufactured by DKS Co. Ltd.), and SUPERFLEX 470 (glass transition temperature: −31 degrees C., manufactured by DKS Co. Ltd.). These can be used alone or in combination.

The content ratio of the resin particle is preferably 1 to 15 percent by mass and more preferably 2 to 10 percent by mass to the total content of ink in light of drying property of the ink.

Other Components

As the other components, examples are coloring materials, preservatives and fungicides, corrosion inhibitors, pH regulators, and transparent anti-aging agents for rubber and plastic such as hindered phenol and hindered phenol amine.

Coloring Material

ISO-2469 (JIS-8148) can be used as the criteria of the whiteness of white ink. In general, a material having a value of 70 or greater can be used as a white material.

Specific examples of metal oxide for use in white ink include, but are not limited to, titanium oxide, iron oxide, tin oxide, zirconium oxide, and iron titanate (complex oxide of iron and titanium).

As the non-white ink having a color different from that of white ink, for example, there are color ink, black ink, gray ink, clear ink, and metallic ink. The clear ink means ink mainly including a resin particle, an organic solvent, and water without a colorant.

Specific examples of the color ink include, but are not limited to, cyan ink, magenta ink, yellow ink, light cyan ink, light magenta ink, red ink, green ink, blue ink, orange ink, and violet ink.

There is no specific limitation to the coloring material for use in the non-white ink as long as it has non-white color and it can be suitably selected to suit to a particular application. For example, dyes and pigments are suitable. These can be used alone or in combination. Of these, pigments are preferable.

Examples of the pigment are organic pigments and inorganic pigments.

As the inorganic pigments, in addition to titanium oxide, iron oxide, calcium oxide, barium sulfate, aluminum hydroxide, barium yellow, cadmium red, and chrome yellow, carbon black manufactured by known methods such as contact methods, furnace methods, and thermal methods can be used. These can be used alone or in combination.

Specific examples of the organic pigments include, but are not limited to, azo pigments (azo lakes, insoluble azo pigments, condensed azo pigments, chelate azo pigments, etc.), polycyclic pigments (phthalocyanine pigments, perylene pigments, perinone pigments, anthraquinone pigments, quinacridone pigments, dioxazine pigments, indigo pigments, thioindigo pigments, isoindolinone pigments, and quinofuranone pigments, etc.), dye chelates (e.g., basic dye type chelates, acid dye type chelates), nitro pigments, nitroso pigments, and aniline black can be used. These can be used alone or in combination.

Also, hollow resin particles and hollow inorganic particles can be used.

Of those pigments, pigments having good affinity with solvents are preferable.

Specific examples of the pigment for black include, but are not limited to, carbon black (C.I. Pigment Black 7) such as furnace black, lamp black, acetylene black, and channel black, metals such as copper and iron (C.I. Pigment Black 11), and organic pigments such as aniline black (C.I. Pigment Black 1). These can be used alone or in combination.

Specific examples of the pigments for color include, but are not limited to, C.I. Pigment Yellow 1, 3, 12, 13, 14, 17, 24, 34, 35, 37, 42 (yellow iron oxide), 53, 55, 74, 81, 83, 95, 97, 98, 100, 101, 104, 108, 109, 110, 117, 120, 138, 150, 153, and 155; C.I. Pigment Orange 5, 13, 16, 17, 36, 43, and 51; C.I. Pigment Red 1, 2, 3, 5, 17, 22, 23, 31, 38, 48:2, 48:2 {Permanent Red 2B(Ca)}, 48:3, 48:4, 49:1, 52:2, 53:1, 57:1 (Brilliant Carmine 6B), 60:1, 63:1, 63:2, 64:1, 81, 83, 88, 101 (rouge), 104, 105, 106, 108 (Cadmium Red), 112, 114, 122 (Quinacridone Magenta), 123, 146, 149, 166, 168, 170, 172, 177, 178, 179, 185, 190, 193, 209, and 219; C.I. Pigment Violet 1 (Rohdamine Lake), 3, 5:1, 16, 19, 23, and 38; C.I. Pigment Blue 1, 2, 15 (Phthalocyanine Blue), 15:1, 15:2, 15:3 (Phthalocyanine Blue), 16, 17:1, 56, 60, and 63; and C.I. Pigment Green 1, 4, 7, 8, 10, 17, 18, and 36. These can be used alone or in combination.

Specific examples of the dye include, but are not limited to, C.I. Acid Yellow 17, 23, 42, 44, 79, and 142, C.I. Acid Red 52, 80, 82, 249, 254, and 289, C.I. Acid Blue 9, 45, and 249, C.I. Acid Black 1, 2, 24, and 94, C. I. Food Black 1 and 2, C.I. Direct Yellow 1, 12, 24, 33, 50, 55, 58, 86, 132, 142, 144, and 173, C.I. Direct Red 1, 4, 9, 80, 81, 225, and 227, C.I. Direct Blue 1, 2, 15, 71, 86, 87, 98, 165, 199, and 202, C.I. Direct Black 19, 38, 51, 71, 154, 168, 171, and 195, C.I. Reactive Red 14, 32, 55, 79, and 249, and C.I. Reactive Black 3, 4, and 35. These can be used alone or in combination.

Examples of the coloring material for use in metallic ink are fine powder prepared by fine pulmerization of metal, alloyed metal, or a metal compound.

Specific examples include, but are not limited to, fine powders obtained by finely-pulverizing metal selected from the group consisting of aluminum, silver, gold, nickel, chrome, tin, zinc, indium, titanium, silicon, copper, and platinum or alloyed metal thereof or an oxide, a nitride, or a sulfide, or a carbide of the metal and alloyed metal and any combination thereof.

To disperse a pigment in an ink, for example, a hydrophilic functional group is introduced into the pigment to prepare a self-dispersible pigment, the surface of the pigment is coated with a resin, or a dispersant is used.

A hydrophilic functional group can be introduced into a pigment by, for example, adding a functional group such as a sulfone group and a carboxyl group to a pigment (e.g., carbon) to make it dispersible in water.

To coat the surface of a pigment with a resin, the pigment is encapsulated into microcapsules to make the pigment dispersible in water. This can be referred to as a resin-coated pigment. In this case, all the pigments to be added to ink are not necessarily entirely coated with a resin. Pigments partially or wholly uncovered with a resin may be dispersed in the ink unless such pigments have an adverse impact.

In a method of using a dispersant to disperse a pigment, for example, a known dispersant of a small molecular weight or a large molecular weight, which is represented by a surfactant, is used to disperse the pigment in ink.

As the dispersant, it is possible to use, for example, an anionic surfactant, a cationic surfactant, a nonionic surfactant, an amphoteric surfactant, etc. depending on a pigment.

Also, a nonionic surfactant (RT-100, manufactured by TAKEMOTO OIL & FAT CO., LTD.) and a formalin condensate of naphthalene sodium sulfonate are suitable as the dispersant.

Those can be used alone or in combination.

Pigment Dispersion

A coloring material may be mixed with materials such as water and an organic solvent to obtain an ink. It is also possible to mix a pigment with water, a dispersant, etc., first to prepare a pigment dispersion and thereafter mix the pigment dispersion with materials such as water and an organic solvent to manufacture an ink.

The pigment dispersion can be obtained by dispersing water, a pigment, a pigment dispersant, and other optional components and adjusting the particle size. It is good to use a dispersing device for dispersion.

The particle diameter of the pigment in the pigment dispersion has no particular limit. For example, the maximum frequency is preferably from 20 to 500 nm and more preferably from 20 to 150 nm in the maximum number conversion to improve dispersion stability of the pigment and ameliorate the discharging stability and image quality such as image density. The particle diameter of the pigment can be measured using a particle size analyzer (Nanotrac Wave-UT151, manufactured by MicrotracBEL Corp).

In addition, the proportion of the pigment in the pigment dispersion is not particularly limited and can be suitably selected to suit a particular application. In terms of improving discharging stability and image density, the proportion is preferably from 0.1 to 50 percent by mass and more preferably from 0.1 to 30 percent by mass.

It is preferable that the pigment dispersion be filtered with a filter, a centrifuge, etc. to remove coarse particles and thereafter degassed.

The number average particle diameter of the pigment has no particular limit and can be suitably selected to suit to a particular application. For example, the pigment preferably has a maximum frequency between 20 to 150 nm in the maximum number conversion. When the number average particle diameter is 20 nm or greater, dispersion and classification operations become easy. When the particle diameter is 150 nm or less, the dispersion stability of pigment as the ink tends to be improved and in addition, discharging stability tends to become excellent, thereby ameliorating the image quality such as image density.

The number average particle diameter can be measured by using a particle size analyzer (Microtrac MODEL UPA 9340, manufactured by Nikkiso Co., Ltd.).

The proportion of the coloring material is preferably from 0.1 to 15 percent by mass and more preferably 1 to 10 percent by mass to the total content of the ink in terms of image density, fixability, and discharging stability. When the content ratio (proportion) is from 0.1 to 15 percent by mass, discharging reliability is good and images having high saturation can be obtained.

Method of Manufacturing Ink

The ink can be manufactured by, for example, stirring and mixing water, the organic solvent, the surfactant, the resin particle, and the optional other components. The dispersion and mixing are conducted by, for example, a sand mill, a homogenizer, a ball mill, a paint shaker, an ultrasonic dispersing device, a stirrer having a typical stirring wing, a magnetic stirrer, and a high speed dispersing device.

The property of the ink is not particularly limited and can be suitably selected to suit to a particular application. For example, viscosity, surface tension, pH, etc., are preferable in the following ranges.

The viscosity of the ink at 25 degrees C. is preferably 5 to 30 mPa·s and more preferably 5 to 25 mPa·s to improve print density and text quality and obtain good dischargeability. Viscosity can be measured by, for example, a rotatory viscometer (RE-80L, manufactured by TOKI SANGYO CO., LTD.). The measuring conditions are as follows:

Standard cone rotor (1°34'×R24)
Sample liquid amount: 1.2 mL
Number of rotations: 50 rotations per minute (rpm)
25 degrees C.
Measuring time: three minutes The surface tension of the ink is preferably 30 mN/m or less and more preferably 27 mN/m or less at 25 degrees C. in terms that the ink is suitably levelized on a recording medium and the drying time of the ink is shortened. When the surface tension is 18 mN/m or less, deforming property of the ink is not easily secured, thereby degrading discharging stability.

The pH of the ink is preferably 7 to 12 and more preferably 8 to 11 in terms of prevention of corrosion of metal materials in contact with the ink.

Substrate

The substrate is not limited to articles used as typical recording media. It is suitable to use building materials such as wall paper and floor material, cloth for apparel, textile, and leather. In addition, the configuration of the paths through which a substrate is conveyed can be adjusted to use ceramics, glass, metal, etc. Next, recording media are described. The substrate is not limited thereto.

Recording Medium

The recording medium is not particularly limited. Plain paper, gloss paper, special paper, cloth, etc. are usable. Also, good images can be formed on a non-permeating recording medium.

The non-permeating recording medium is a substrate having a surface with low moisture permeability and absorbency and includes a material having myriad of hollow spaces inside but not open to the outside. To be more quantitative, such a substrate has a water-absorption amount of 10 mL/m$^2$ or less from the initiation of the contact until 30 msec$^{1/2}$ after the contact according to Bristow method.

For example, plastic films of polyvinyl chloride resin, polyethylene terephthalate (PET), polypropylene, polyethylene, and polycarbonate are suitably used as the non-permeating substrate.

Ink Container

The ink container of the present disclosure includes one or more ink accommodating units to accommodate respective inks in the ink set of the present disclosure and other optional suitably-selected members.

There is no specific limit to the ink accommodating unit. Any form, any structure, any size, and any material can be suitably selected to suit to a particular application. For example, an ink accommodating unit including at least an ink bag made of aluminum laminate film, a resin film, etc. can be suitably used.

Inkjet Recording Method and Inkjet Recording Device

The inkjet recording method and the inkjet recording device of the present disclosure is described. In the description, recording media are used as the substrate. The The recording method of the present disclosure includes discharging an ink contained in the ink set to apply the ink to a substrate for printing. In addition, the inkjet recording device of the present disclosure includes at least the ink container described above and an ink discharging device to discharge the ink described above. The inkjet recording device is to record images on substrates with the ink. Examples as the inkjet recording device are printers, facsimile machines, photocopiers, multifunction peripherals (serving as a printer, a facsimile machine, and a photocopier), 3D printers, etc.

In addition to the ink discharging step and the ink discharging device, the inkjet recording method and the inkjet recording device may include steps of and devices for feeding, conveying, and ejecting a recording medium and other steps of and devices for pre-processing and/or post-processing.

In addition, the inkjet recording method and the inkjet recording device may furthermore optionally include a step of heating and a heater and a step or drying and a drier. For example, these steps and devices include, for example, steps of and devices for heating and drying printed surfaces of recording media and rear side thereof. More specifically, fan heaters, infra red heaters, etc. can be used. Heating and drying can be conducted before, in the middle of, or after printing.

In addition, images formed by the recording method and the recording device of the present disclosure are not limited to meaningful visible images such as texts and figures with ink. For example, the recording method and the recording device can produce patterns like geometric design and 3D images.

In addition, the ink discharging device in the inkjet recording device of the present disclosure is not particularly limited and includes known discharging heads including both a serial type device in which the liquid discharging head is caused to move and a line type device in which the liquid discharging head is not caused to move.

Furthermore, in addition to the desktop type, the inkjet recording device of the present disclosure includes a recording device capable of printing images on a large recording medium, for example, A0 size, and a continuous printer capable of using continuous paper wound up in a roll form as recording media.

Figure 2:
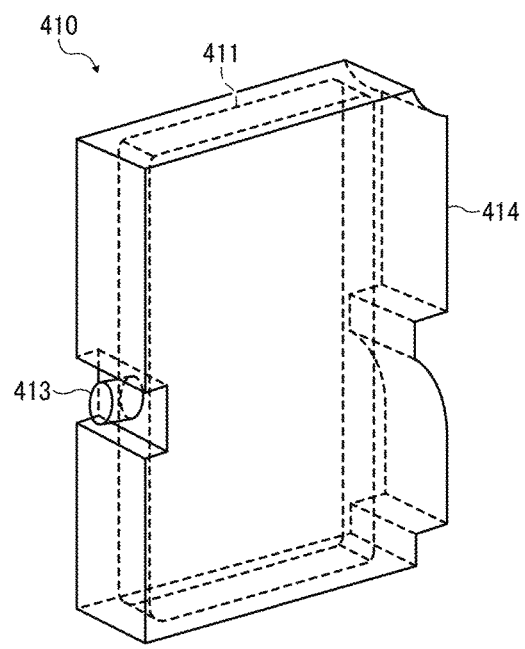
FIG. 2 is a perspective diagram illustrating a diagram of an example of the ink container according to an embodiment of the present invention.

FIG. 1 is a perspective view illustrating an embodiment of the inkjet recording device of the present disclosure and FIG. 2 is a perspective view illustrating an embodiment of the ink container of the present disclosure. An image forming apparatus 400 as an embodiment of the recording device is a serial type image forming apparatus. A mechanical unit 420 is disposed in an exterior 401 of the image forming apparatus 400. Each ink accommodating unit 411 of each main tank 410 (410k, 410c, 410m, and 410y) for each color of black (K), cyan (C), magenta (M), and yellow (Y) is made of a packaging member such as aluminum laminate film. The ink accommodating unit 411 is accommodated in, for example, a plastic housing unit 414. As a result, the main tank 410 is used as an ink cartridge of each color.

A cartridge holder 404 (ink container) is disposed on the rear side of the opening when a cover 401c is opened. The cartridge holder 404 is detachably attached to the main tank 410. As a result, each ink discharging outlet 413 of the main tank 410 communicates with a discharging head 434 for each color via a supplying tube 436 for each color so that the ink can be discharged from the discharging head 434 to a recording medium.

Heating Process and Heating Device

The heating process and the heater (heating device) preferably apply heat to recording media on which images are recorded.

Quality images can be recorded on recording media including non-permeable recording media by the inkjet recording method and the recording device of the present disclosure. However, it is preferable to heat an image after recording in order to achieve better abrasion resistance with better quality images, form images with more attachability to recording media, and deal with high performance recording conditions. Due to the heat provided to an image, film forming of resin particles contained in an ink is promoted so that image hardness of printed matter can be enhanced.

Figure 3:
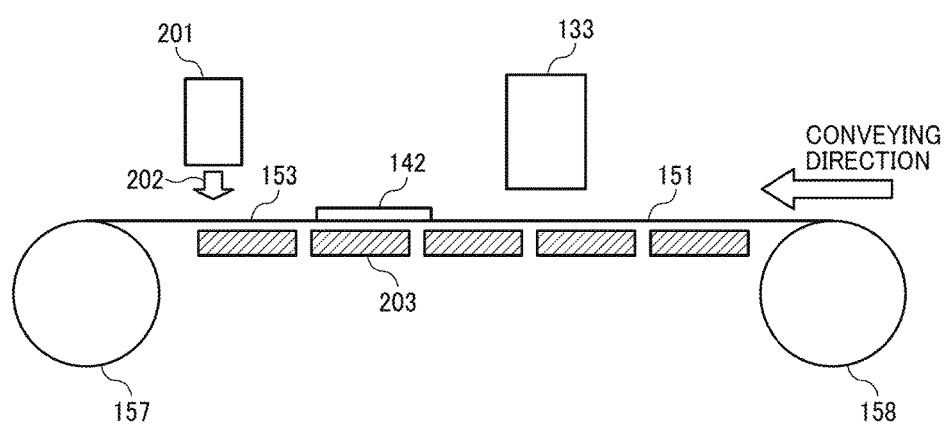
FIG. 3 is a schematic diagram illustrating an example of a heater.

FIG. 3 is a schematic diagram illustrating an example of the heating device. As illustrated in FIG. 3, due to driving of a recording head in response to image signals while moving a carriage 133, ink droplets are discharged onto a recording medium 142 standing still to form an image thereon. The guiding member 153 supports the recording medium 142. The recording medium 142 is conveyed in the conveyance direction on a conveyor belt 151 stretched between a transfer roller 157 and a tension roller 158. A heating fan 201 serving as a heated wind generator blows a heated wind 202 onto the image formed on the recording medium 142. As a result, the image is heated.

On the reverse side (on which the recording medium 142 is not placed) of the conveyor belt 151, a group of heaters 203 are disposed to provide heat to the recording medium 142 on which the image is formed.

Print Method

The print method includes a first recording process to form a non-white image on a substrate with a non-white ink in the ink set of the present disclosure and a second recording process to form a white image on the non-white image with the white ink of the present disclosure. Since the white ink and the ink set of the present disclosure have good drying property, color bleeding of the non-white image to the white image as a backdrop can be significantly suppressed by the print method and also high gloss and good abrasion resistance can be imparted to a non-permeable recording medium. The first recording process and the second recording process can be reversed.

The white ink can be partially or entirely applied to the surface of a substrate. When partially applied to a substrate, for example, it is possible to partially or entirely apply the white ink to the same portion as for the non-white image.

The print method of the present disclosure is not limited to inkjet recording methods but also to other methods.

Specific examples of such other methods include, but are not limited to, a blade coating method, a gravure coating method, a gravure offset coating method, a bar coating method, a roll coating method, a knife coating method, an air knife coating method, a comma coating method, a U comma coating method, an AKKU coating method, a smoothing coating method, a micro gravure coating method, a reverse roll coating method, a four or five roll coating method, a dip coating method, a curtain coating method, a slide coating method, a die coating method, and spray coating method.

In an embodiment, a method other than the inkjet recording method is employed when applying the white ink to the entire surface of a substrate and the inkjet recording method can be employed when applying the non-white ink to the substrate.

Printed Matter

The printed matter of the present disclosure includes a print layer formed on a substrate such as a recording medium using the ink set of the present disclosure.

For example, printed matter can be formed by an inkjet recording method and an inkjet recording device.

Image forming, recording, printing, etc. in the present disclosure represent the same meaning.

Having generally described preferred embodiments of this invention, further understanding can be obtained by reference to certain specific examples which are provided herein for the purpose of illustration only and are not intended to be limiting. In the descriptions in the following examples, the numbers represent weight ratios in parts, unless otherwise specified.

EXAMPLES

Next, the present disclosure is described in detail with reference to Examples and Comparative Examples but not limited thereto.

Preparation Example 1 of Pigment Dispersion

Preparation of Black Pigment Dispersion

After preliminarily mixing the following recipe, the mixture was subject to circulation dispersion for seven hours by a disk-type bead mill (KDL type, manufactured by SHIN-MARU ENTERPRISES CORPORATION, Media: zirconia ball having a diameter of 0.3 mm) to obtain a black pigment dispersion (concentration of pigment solid portion: 15 percent by mass) was obtained.

| | |
|---|---|
| Carbon black pigment (Product: Monarch 800, manufactured by Cabot Corporation): | 15 parts |
| Anionic surfactant (Product: Pionine A-51-B, manufactured by TAKEMOTO OIL & FAT Co., Ltd.): | 2 parts |
| Deionized water: | 83 parts |

Preparation Example 2 of Pigment Dispersion

Preparation of Cyan Pigment Dispersion

A cyan pigment dispersion (concentration of pigment solid portion: 15 percent by mass) was obtained in the same manner as Preparation Example 1 of Pigment Dispersion except that the carbon black pigment was changed to Pigment Blue 15:3 (Product: LIONOL BLUE FG-7351, manufactured by TOYO INK CO., LTD.).

Preparation Example 3 of Pigment Dispersion

Preparation of Magenta Pigment Dispersion

A magenta pigment dispersion (concentration of pigment solid portion: 15 percent by mass) was obtained in the same manner as Preparation Example 1 of Pigment Dispersion except that the carbon black pigment was changed to Pigment Red 122 (Product: TONER MAGENTA E002, manufactured by Clariant Japan K.K.).

Preparation Example 4 of Pigment Dispersion

Preparation of Yellow Pigment Dispersion 1

A yellow pigment dispersion 1 (concentration of pigment solid portion: 15 percent by mass) was obtained in the same manner as Preparation Example 1 of Pigment Dispersion except that the carbon black pigment was changed to Pigment Yellow 155 (Product: TONER YELLOW 3GP, manufactured by Clariant Japan K.K.).

Preparation Example 5 of Pigment Dispersion

Preparation of Liquid Dispersion of White Pigment 25 parts of titanium oxide (Product: STR-100W, manufactured by Sakai Chemical Industry Co., Ltd.), 5 parts of a pigment dispersant (Product: TEGO Dispers 651, manufactured by Evonik Japan Co., Ltd.), and 70 parts of water were mixed followed by dispersion for five minutes using a bead mill (Product: Research Labo, manufactured by Shinmaru Enterprises Corporation) with 0.3 mm diameter zirconia beads and a filling ratio of 60 percent at 8 m/s to obtain a liquid dispersion of white pigment.

Preparation of Polyurethane Resin Emulsion 1

100 parts of methylethyl ketone, 345 parts of polyesterpolyol 1 (which was obtained from iPA/AA=6/4 in molar ratio and EG/NPG=1/9 in molar ratio, where iPA=isophthalic acid, AA=adipic acid, EG=ethylene glycol, and NPG=neopentyl glycol, number average molecular weight=2,000, number of average functional groups=2) and 9.92 parts by mass of 2,2-dimethylol propionic acid (DMPA) were placed in a reaction container of 2 L equipped with a stirrer, a thermometer, a nitrogen sealing tube, and a condenser and uniformly mixed at 60 degrees C.

Thereafter, 45.1 parts of triethylene glycol diisocyanate (TEGDI) and 0.08 parts of dioctyltin dilaurate (DOTDL) were placed therein to conduct reaction at 72 degrees C. for three hours to obtain a polyurethane solution.

To this polyurethane solution, 80 parts of isopropyl alcohol (IPA), 220 parts of methylethyl ketone (MEK), 3.74 parts of triethylamine (TEA), and 596 parts of water were charged to cause transfer phase. Subsequently, MEK, IPA, and TEA were removed by a rotary evaporator to obtain polyurethane resin emulsion 1.

After the thus-obtained aqueous emulsion was cooled down to room temperature, deionized water and sodium hydroxide aqueous solution were added to adjust the solution such that the solid portion thereof was 30 percent by mass and the pH was 8.

The glass transition temperature (Tg) of the emulsion 1 was 0 degrees when measured by Thermo plus EVO2 (manufactured by Rigaku).

Preparation of Polyurethane Resin Emulsion 2

1,500 g of polycarbonate diol (reaction product of 3-methyl-1,5-pentanediol and diphenyl carbonate, number average molecular weight Mn: 1,200), 220 g of 2,2-dimethylol propionic acid (DMPA), and 1,347 g of N-methyl pyrolidone (NMP) were charged in a reaction container equipped with a stirrer, a reflux cooling tube, and a thermometer in a nitrogen atmosphere followed by heating to 60 degrees C. to dissolve DMPA. Thereafter, 1,445 g of 4,4'dicyclohexyl methane diisocyanate and 2.6 g of dibutyl tin dilaurylate (catalyst) were added thereto and the resultant was heated to 90 degrees C. to complete urethanation reaction in five hours. As a result, a urethane prepolymer having an isocyanate group at its distal end was obtained. This reaction mixture was cooled down to 80 degrees C. and 149 g of triethyl amine was admixed therewith. 4,340 g of the resultant mixture was extracted and charged in a liquid mixture of 5,440 g of water and 15 g of triethyl amine under vigorous stirring. Thereafter, 1,500 g of ice and 626 g of a 35 percent aqueous solution of 1,6-hexamethylene diamine were added to conduct chain elongation reaction followed by distilling away the solvent in such a manner that the concentration of the solid portion thereof was 30 percent to obtain a polyurethane resin emulsion 2.

The glass transition temperature (Tg) of the emulsion 2 was 10 degrees when measured by Thermo plus EVO2 (manufactured by Rigaku).

Example 1

20 percent by mass of a pigment dispersion (non-white), 15 percent by mass of the resin emulsion 1, 1.0 percent by mass of a surfactant (BYK-348, manufactured by BYK Japan KK), 14 percent by mass of 1,2-propane diol, 5 percent by mass of 1,3-butane diol, 5 percent by mass of 1,2-hexanediol, 12 percent by mass of 3-methoxy-N,N-dimethyl propionamide (Equamide™ M100, manufactured by Idemitsu Kosan Co., Ltd.), 4 percent by mass of diethylene glycol monobutylether, 0.1 percent by mass of a preservative (Product: Proxel LV, manufactured by AVECIA GROUP), and the rest of highly-pure water were added, mixed, stirred, and filtrated with a polypropylene filter having an average diameter hole of 0.2 μm (Product: Betafine, polypropylene pleat filter PPG series, manufactured by 3M) to prepare a non-white ink.

20 percent by mass of the pigment dispersion (white), 15 percent by mass of the resin emulsion 1, 1.0 percent by mass of a surfactant (BYK-348, manufactured by BYK Japan KK), 10 percent by mass of 1,2-propane diol, 5 percent by mass of 1,3-butane diol, 5 percent by mass of 1,2-hexanediol, 16 percent by mass of 3-methoxy-N,N-dimethyl propionamide (Equamide™ M100, manufactured by Idemitsu Kosan Co., Ltd.), 4 percent by mass of diethylene glycol monobutylether, 0.1 percent by mass of a preservative (Product: Proxel LV, manufactured by AVECIA GROUP), and the rest of highly-pure water were added, mixed, stirred, and filtrated with a polypropylene filter having an average diameter hole of 0.2 μm (Product: Betafine, polypropylene pleat filter PPG series, manufactured by 3M) to prepare a white ink.

An ink set including the non-white ink and the white ink prepared as described above were manufactured.

Example 2

20 percent by mass of a pigment dispersion, 15 percent by mass of a resin emulsion (Product: SUPERFLEX® 300, manufactured by DKS Co. Ltd., concentration of solid portion: 30 percent by mass), 1.0 percent by mass of a surfactant (BYK-348, manufactured by BYK Japan KK), 10 percent by mass of 1,2-propane diol, 3 percent by mass of 1,2-hexane diol, 24 percent by mass of 3-methoxy-N,N-dimethyl propionamide (Equamide™ M100, manufactured by Idemitsu Kosan Co., Ltd.), 3 percent by mass of diethylene glycol monobutylether, 0.1 percent by mass of a preservative (Product: Proxel LV, manufactured by AVECIA GROUP), and the rest of highly-pure water were added, mixed, stirred, and filtrated with a polypropylene filter having an average diameter hole of 0.2 μm (Product: Betafine, polypropylene pleat filter PPG series, manufactured by 3M) to prepare an ink set including each color ink.

Examples 3 to 8 and Comparative Examples 1 to 2

Respective ink sets including respective color inks of Examples 3 to 8 and Comparative Examples 1 to 2 were prepared in the same manner as in Example 2 except that the compositions and the proportions were changed as shown in Tables 1 to 4.

TABLE 1

| Ink composition | Example 1 | | | | | Example 2 | | | | | Example 3 | | | | |
| --- | --- | --- | --- | --- | --- | --- | --- | --- | --- | --- | --- | --- | --- | --- | --- |
| Liquid dispersion of black pigment No volatile portion: 15 percent | 20 | | | | | 20 | | | | | 20 | | | | |
| Liquid dispersion of cyan pigment No volatile portion: 15 percent | | 20 | | | | | 20 | | | | | 20 | | | |
| Liquid dispersion of magenta pigment No volatile portion: 15 percent | | | 20 | | | | | 20 | | | | | 20 | | |
| Liquid dispersion of yellow pigment No volatile portion: 15 percent | | | | 20 | | | | | 20 | | | | | 20 | |
| Liquid dispersion of white pigment No volatile portion: 15 percent | | | | | 20 | | | | | 20 | | | | | 20 |
| Resin emulsion 1 | 15.0 | 15.0 | 15.0 | 15.0 | 15.0 | | | | | | 15.0 | 15.0 | 15.0 | 15.0 | 15.0 |
| Resin emulsion 2 | | | | | | | | | | | | | | | |
| Resin emulsion 3 SUPERFLEX 300 | | | | | | 15.0 | 15.0 | 15.0 | 15.0 | 15.0 | | | | | |
| Acrylic silicone resin emulsion AE980 | | | | | | | | | | | | | | | |
| BYK-348 Surfactant | 1.0 | 1.0 | 1.0 | 1.0 | 1.0 | 1.0 | 1.0 | 1.0 | 1.0 | 1.0 | 1.0 | 1.0 | 1.0 | 1.0 | 1.0 |
| FS300 Surfactant | | | | | | | | | | | | | | | |
| 1,2-propane diol | 14 | 14 | 14 | 14 | 10 | 10 | 10 | 10 | 10 | 10 | 4 | 4 | 4 | 4 | 4 |
| 1,3-butane diol | 5 | 5 | 5 | 5 | 5 | | | | | | | | | | |
| 1,2-hexane diol | 5 | 5 | 5 | 5 | 5 | 3 | 3 | 3 | 3 | 3 | 2 | 2 | 2 | 2 | 2 |
| Equamide ™ M100 3-methoxy-N,N-dimethyl propionamide | 12 | 12 | 12 | 12 | 16 | 24 | 24 | 24 | 24 | 24 | | | | | |
| 3-buthoxy-N,N-dimethyl propionamide | | | | | | | | | | | 32 | 32 | 32 | 32 | 32 |
| 3-ethoxy-N,N-dimethyl propionamide | | | | | | | | | | | | | | | |
| Diethylene glycol | 4 | 4 | 4 | 4 | 4 | 3 | 3 | 3 | 3 | 3 | 2 | 2 | 2 | 2 | 2 |

TABLE 1-continued

| Ink composition | Example 1 | | | | | Example 2 | | | | | Example 3 | | | | |
|---|---|---|---|---|---|---|---|---|---|---|---|---|---|---|---|
| monobutylether | | | | | | | | | | | | | | | |
| Proxel LV (manufactured by AVECIA GROUP) | 0.1 | 0.1 | 0.1 | 0.1 | 0.1 | 0.1 | 0.1 | 0.1 | 0.1 | 0.1 | 0.1 | 0.1 | 0.1 | 0.1 | 0.1 |
| Highly pure water | Rest | Rest | Rest | Rest | Rest | Rest | Rest | Rest | Rest | Rest | Rest | Rest | Rest | Rest | Rest |
| Total amount | 100 | 100 | 100 | 100 | 100 | 100 | 100 | 100 | 100 | 100 | 100 | 100 | 100 | 100 | 100 |

TABLE 2

| Ink composition | Example 4 | | | | | Example 5 | | | | | Example 6 | | | | |
|---|---|---|---|---|---|---|---|---|---|---|---|---|---|---|---|
| Liquid dispersion of black pigment No volatile portion: 15 percent | 20 | | | | | 20 | | | | | 20 | | | | |
| Liquid dispersion of cyan pigment No volatile portion: 15 percent | | 20 | | | | | 20 | | | | | 20 | | | |
| Liquid dispersion of magenta pigment No volatile portion: 15 percent | | | 20 | | | | | 20 | | | | | 20 | | |
| Liquid dispersion of yellow pigment No volatile portion: 15 percent | | | | 20 | | | | | 20 | | | | | 20 | |
| Liquid dispersion of white pigment No volatile portion: 15 percent | | | | | 20 | | | | | 20 | | | | | 20 |
| Resin emulsion 1 | | | | | | | | | | | | | | | |
| Resin emulsion 2 | | | | | | | | | | | | | | | |
| Resin emulsion 3 SUPERFLEX 300 | 15.0 | 15.0 | 15.0 | 15.0 | 15.0 | 15.0 | 15.0 | 15.0 | 15.0 | 15.0 | 15.0 | 15.0 | 15.0 | 15.0 | 15.0 |
| Acrylic silicone resin emulsion AE980 | | | | | | | | | | | | | | | |
| BYK-348 Surfactant | 1.0 | 1.0 | 1.0 | 1.0 | 1.0 | 1.0 | 1.0 | 1.0 | 1.0 | 1.0 | | | | | |
| FS300 Surfactant | | | | | | | | | | | 1.0 | 1.0 | 1.0 | 1.0 | 1.0 |
| 1,2-propane diol | 4 | 4 | 4 | 4 | 4 | 10 | 10 | 10 | 10 | 10 | 10 | 10 | 10 | 10 | 10 |
| 1,3-butane diol | | | | | | 5 | 5 | 5 | 5 | 5 | | | | | |
| 1,2-hexane diol | | | | | | 5 | 5 | 5 | 5 | 5 | 3 | 3 | 3 | 3 | 3 |
| Equamide ™ M100 3-methoxy-N,N-dimethyl propionamide | | | | | | 16 | 16 | 16 | 16 | 16 | 24 | 24 | 24 | 24 | 24 |
| 3-buthoxy-N,N-dimethyl propionamide | | | | | | | | | | | | | | | |
| 3-ethoxy-N,N-dimethyl propionamide | 36 | 36 | 36 | 36 | 36 | | | | | | | | | | |
| Diethylene glycol monobutylether | | | | | | 4 | 4 | 4 | 4 | 4 | 3 | 3 | 3 | 3 | 3 |

TABLE 2-continued

| Ink composition | Example 4 | | | | | Example 5 | | | | | Example 6 | | | | |
|---|---|---|---|---|---|---|---|---|---|---|---|---|---|---|---|
| Proxel LV (manufactured by AVECIA GROUP) | 0.1 | 0.1 | 0.1 | 0.1 | 0.1 | 0.1 | 0.1 | 0.1 | 0.1 | 0.1 | 0.1 | 0.1 | 0.1 | 0.1 | 0.1 |
| Highly pure water | Rest | Rest | Rest | Rest | Rest | Rest | Rest | Rest | Rest | Rest | Rest | Rest | Rest | Rest | Rest |
| Total amount | 100 | 100 | 100 | 100 | 100 | 100 | 100 | 100 | 100 | 100 | 100 | 100 | 100 | 100 | 100 |

TABLE 3

| Ink composition | Example 7 | | | | | Example 8 | | | | |
|---|---|---|---|---|---|---|---|---|---|---|
| Liquid dispersion of black pigment No volatile portion: 15 percent | 20 | | | | | 20 | | | | |
| Liquid dispersion of cyan pigment No volatile portion: 15 percent | | 20 | | | | | 20 | | | |
| Liquid dispersion of magenta pigment No volatile portion: 15 percent | | | 20 | | | | | 20 | | |
| Liquid dispersion of yellow pigment No volatile portion: 15 percent | | | | 20 | | | | | 20 | |
| Liquid dispersion of white pigment No volatile portion: 15 percent | | | | | 20 | | | | | 20 |
| Resin emulsion 1 | | | | | | | | | | |
| Resin emulsion 2 | | | | | | 15.0 | 15.0 | 15.0 | 15.0 | 15.0 |
| Resin emulsion 3 SUPERFLEX 300 | | | | | | | | | | |
| Acrylic silicone resin emulsion AE980 | 10.0 | 10.0 | 10.0 | 10.0 | 10.0 | | | | | |
| BYK-348 Surfactant | 1.0 | 1.0 | 1.0 | 1.0 | 1.0 | 1.0 | 1.0 | 1.0 | 1.0 | 1.0 |
| FS300 Surfactant | | | | | | | | | | |
| 1,2-propane diol | 10 | 10 | 10 | 10 | 10 | 4 | 4 | 4 | 4 | 4 |
| 1,3-butane diol | | | | | | | | | | |
| 1,2-hexane diol | 3 | 3 | 3 | 3 | 3 | 2 | 2 | 2 | 2 | 2 |
| Equamide™ M100 | | | | | | | | | | |
| 3-methoxy-N,N-dimethyl propionamide | | | | | | | | | | |
| 3-buthoxy-N,N-dimethyl propionamide | 24 | 24 | 24 | 24 | 24 | | | | | |
| 3-ethoxy-N,N-dimethyl propionamide | | | | | | 32 | 32 | 32 | 32 | 32 |
| Diethylene glycol monobutylether | 3 | 3 | 3 | 3 | 3 | 2 | 2 | 2 | 2 | 2 |

TABLE 3-continued

| Ink composition | Example 7 | | | | | Example 8 | | | | |
|---|---|---|---|---|---|---|---|---|---|---|
| Proxel LV (manufactured by AVECIA GROUP) | 0.1 | 0.1 | 0.1 | 0.1 | 0.1 | 0.1 | 0.1 | 0.1 | 0.1 | 0.1 |
| Highly pure water | Rest | Rest | Rest | Rest | Rest | Rest | Rest | Rest | Rest | Rest |
| Total amount | 100 | 100 | 100 | 100 | 100 | 100 | 100 | 100 | 100 | 100 |

TABLE 4

| Ink composition | Comparative Example 1 | | | | | Comparative Example 2 | | | | |
|---|---|---|---|---|---|---|---|---|---|---|
| Liquid dispersion of black pigment No volatile portion: 15 percent | 20 | | | | | 20 | | | | |
| Liquid dispersion of cyan pigment No volatile portion: 15 percent | | 20 | | | | | 20 | | | |
| Liquid dispersion of magenta pigment No volatile portion: 15 percent | | | 20 | | | | | 20 | | |
| Liquid dispersion of yellow pigment No volatile portion: 15 percent | | | | 20 | | | | | 20 | |
| Liquid dispersion of white pigment No volatile portion: 15 percent | | | | | 20 | | | | | 20 |
| Resin emulsion 1 | | | | | | | | | | |
| Resin emulsion 2 | | | | | | | | | | |
| Resin emulsion 3 SUPERFLEX 300 | 15.0 | 15.0 | 15.0 | 15.0 | 15.0 | 15.0 | 15.0 | 15.0 | 15.0 | 15.0 |
| Acrylic silicone resin emulsion AE980 | | | | | | | | | | |
| BYK-348 Surfactant | 1.0 | 1.0 | 1.0 | 1.0 | 1.0 | 1.0 | 1.0 | 1.0 | 1.0 | 1.0 |
| FS300 Surfactant | | | | | | | | | | |
| 1,2-propane diol | 10 | 10 | 10 | 10 | 10 | 15 | 15 | 15 | 15 | 15 |
| 1,3-butane diol | 8 | 8 | 8 | 8 | 8 | 15 | 15 | 15 | 15 | 15 |
| 1,2-hexane diol | 5 | 5 | 5 | 5 | 5 | 5 | 5 | 5 | 5 | 5 |
| Equamide™ M100 | 12 | 12 | 12 | 12 | 12 | | | | | |
| 3-methoxy-N,N-dimethyl propionamide | | | | | | | | | | |
| 3-buthoxy-N,N-dimethyl propionamide | | | | | | | | | | |
| 3-ethoxy-N,N-dimethyl propionamide | | | | | | | | | | |
| Diethylene glycol monobutylether | 5 | 5 | 5 | 5 | 5 | 5 | 5 | 5 | 5 | 5 |

TABLE 4-continued

| Ink composition | Comparative Example 1 | | | | | Comparative Example 2 | | | | |
|---|---|---|---|---|---|---|---|---|---|---|
| Proxel LV (manufactured by AVECIA GROUP) | 0.1 | 0.1 | 0.1 | 0.1 | 0.1 | 0.1 | 0.1 | 0.1 | 0.1 | 0.1 |
| Highly pure water | Rest | Rest | Rest | Rest | Rest | Rest | Rest | Rest | Rest | Rest |
| Total amount | 100 | 100 | 100 | 100 | 100 | 100 | 100 | 100 | 100 | 100 |

In Tables 1 to 4, the product names and the manufacturing companies of the ingredients are as follows:

Urethane resin emulsion 3: Product: SUPERFLEX® 300, manufactured by DKS Co. Ltd., concentration of solid portion: 30 percent, Tg: −42 degrees C.):

Acrylic-silicone resin emulsion (Product: AE980, manufactured by EMULSION TECHNOLOGY CO., LTD., concentration of solid portion: 50 percent by mass, Tg:—14 degrees C.)

Surfactant: BYK-348, manufactured by BYK Japan KK: Polyether-modified polysiloxane-based surfactant Surfactant: FS300, manufactured by E. I. du Pont de Nemours and Company, fluorochemical surfactant)

Amide compound: Equamide™ M100, manufactured by Idemitsu Kosan Co., Ltd., 3-methoxy-N,N-dimethyl propionamide Additive: PROXEL LV, manufactured by AVECIA GROUP Forming of Solid Image (White Ink Previously Applied)

An ink cartridge filled with each ink of Examples and Comparative Example was mounted onto an inkjet printer (RICOH Pro L4160, manufactured by Ricoh Company Ltd.). After the first recording process in which the white ink shown in Tables 1 to 4 was discharged onto a transparent PET sheet (LLPET 1223, manufactured by SAKURAI CO., LTD.) of non-porous substrate to form a solid image, the image was heated and dried. Thereafter, the color ink (non-white ink) was discharged onto the white ink to conduct the second recording process to form a solid image to print a color evaluation chart of cyan, magenta, yellow, and black. Moreover, the evaluation chart was dried for one hour on a hot plate (NINOS ND-1, manufactured by AS ONE Corporation.) set at 60 degrees C. immediately after the output of the evaluation.

Image Forming of Solid Image (Color Ink Previously Applied)

An ink cartridge filled with each ink of Examples and Comparative Example was mounted onto an inkjet printer (RICOH Pro L4160, manufactured by Ricoh Company Ltd.). After the first recording process in which the color ink shown in Tables 1 to 4 was discharged onto a non-porous substrate transparent PET sheet (LLPET 1223, manufactured by SAKURAI CO., LTD.) to form a solid image, the image was heated and dried. Thereafter, the white ink was discharged onto the color ink to conduct the second recording process to form a solid image to print a color evaluation chart. The evaluation chart used was the same as the evaluation chart for the color mentioned above. Moreover, the evaluation chart was dried for one hour on a hot plate (NINOS ND-1, manufactured by AS ONE Corporation.) set at 60 degrees C. immediately after the output of the evaluation.

As described below, the chart was evaluated regarding color bleeding, drying property, fixability (beading), discharging stability, image gloss, and abrasion resistance. The results are shown in Table 5.

Taking into account outdoor use, considerably severe criteria were adopted for fixability in comparison with printing on plain paper.

Evaluation on Color Bleeding (White Ink Previously Applied)

Regarding the solid image (white ink previously applied), the test pattern printed on the evaluation chart was visually observed to evaluate the degree of occurrence of abnormal images incurring color bleeding, beading, etc. The solid image (white ink previously applied) was used to conduct evaluation from the printed surface side.

The evaluation was conducted by 5-level scaling as follows. Of the five levels, E, G, and M are allowable in terms of practical use.

Evaluation on Blur

E (Excellent): No color bleeding occurred

G (Good): Extremely slight color bleeding partially confirmed

M (Marginal): Slight color bleeding confirmed at the entire of the border

P (Poor): Image blur confirmed at the entire of the border

Very poor (VP): Image blur confirmed all over the band pattern

Evaluation on Color Bleeding (Color Ink Previously Applied)

Regarding the solid image (white ink previously applied), the test pattern printed on the evaluation chart was visually observed to evaluate the degree of occurrence of abnormal images incurring color bleeding, beading, etc. The solid image (color ink previously applied) was used to conduct evaluation from the recording medium side via the transparent PET sheet.

The evaluation was conducted at 5-level scaling. Of the five levels, E, G, and M are allowable in terms of practical use.

Evaluation on Color Bleeding

E (Excellent): No color bleeding occurred

G (Good): Extremely slight color bleeding partially confirmed

M (Marginal): Slight color bleeding confirmed at the entire of the border

P (Poor): Color bleeding confirmed at the entire of the border

Very poor (VP): Color bleeding confirmed all over the band pattern

Drying Property

An ink cartridge filled with each ink of Examples and Comparative Example was mounted onto an inkjet printer (RICOH Pro L4160, manufactured by Ricoh Company Ltd.). A solid image was formed on a transparent PET sheet (LLPET 1223, manufactured by SAKURAI CO., LTD.) of non-porous substrate with an ink attached amount of 0.6 g/cm². The solid image was dried on a hot plate (NINOS ND-1, manufactured by AS ONE Corporation.) set at 50 degrees C. A filter paper was pressed against the solid portion of the solid image after being dried and the transfer of the ink to the filter paper was visually observed to evaluate drying property based on the following evaluation criteria.

The evaluation was made to all of the individual colors. In the evaluation results, no difference was seen among the colors.

Evaluation Criteria

E (Excellent): No transfer of ink to filter paper under the drying condition of 50 degrees C. and the drying time of three minutes or less G (Good): No transfer of ink to filter paper under the drying condition of 50 degrees C. and the drying time of from longer than three minutes to five minutes M (Marginal): No transfer of ink to filter paper under the drying condition of 50 degrees C. and the drying time of from longer than five minutes to eight minutes P (Poor): No transfer of ink to filter paper under the drying condition of 50 degrees C. and the drying time of from longer than eight minutes to ten minutes VP (Very poor): Transfer of ink to filter paper still occur under the drying condition of 50 degrees C. and the drying time of not shorter than ten minutes Fixability (Beading)

Uneven recording of the solid image produced for the evaluation of drying property described above was visually observed to evaluate beading according to the following evaluation criteria. E and Gin the evaluation are preferable in terms of practical use.

Evaluation Criteria

E (Excellent): No beading
G (Good): Beading slightly observed
F (Fair): Beading observed
P (Poor): Beading significantly observed

TABLE 5

|  | Color bleeding (white ink previously discharged) | Color bleeding (non-white ink previously discharged) | Drying property | Fixability (beading) |
| --- | --- | --- | --- | --- |
| Example 1 | E | G | E | E |
| Example 2 | E | E | E | E |
| Example 3 | E | E | E | E |
| Example 4 | G | G | E | E |
| Example 5 | E | E | M | G |
| Example 6 | E | E | G | G |
| Example 7 | G | G | E | E |
| Example 8 | E | E | G | E |
| Comparative Example 1 | M | M | P | F |
| Comparative Example 2 | P | P | VP | P |

Example 1 is for an ink set of the present disclosure and image bleeding on the image (white ink previously applied) is less. Good drying property and fixability are confirmed.

Examples 2 and 3 are preferable Examples in the ink set of the present disclosure. Color bleeding is little when printing double layers. Good drying property and fixability are confirmed.

In Example 4, the content of the amide compound is a little more and it is slightly inferior to Examples 2 and 3 with regard to color bleeding.

In Example 5, the content of the amide compound is a little less and it is inferior to Examples 2 and 3 with regard to drying property and fixability.

In Example 6, a fluorochemical surfactant is used as the surfactant and it is inferior to Examples 2 and 3 with regard to fixability.

In Example 7, an acrylic-silicone resin is used as the resin particle and it is inferior to Examples 2 and 3 with regard to color bleeding.

In Example 8, the glass transition temperature of the polyurethane resin is 0 degrees C. or higher and it is inferior to Examples 2 and 3 with regard to drying property.

In Comparative Example 1, the content of the amide compound is less and it is inferior to Example 2 in particular with regard to color bleeding, drying property, and fixability.

In Comparative Example 2, no amide compound is contained and it is further inferior to Comparative Example 1 with regard to color bleeding, drying property, and fixability.

According to the present disclosure, a white ink is provided which can suppress color bleeding and have excellent drying property and fixability.

Having now fully described embodiments of the present invention, it will be apparent to one of ordinary skill in the art that many changes and modifications can be made thereto without departing from the spirit and scope of embodiments of the invention as set forth herein.

What is claimed is:

1. A white ink comprising:

a metal oxide;

polyurethane resin particles having a glass transition temperature of 0 degrees C. or lower; and an organic solvent comprising an amide compound of formula (1), wherein an amount of the amide compound of formula 1 is 40 percent by mass or more of the organic solvent, $$R_1-O-\underset{H_2}{C}-\underset{H_2}{C}-\underset{\underset{R_3}{|}}{\overset{\overset{O}{\|}}{C}}-N-R_2 \qquad (1)$$

wherein $R_1$ represents a straight-chained or branch-chained alkyl group having one to six carbon atoms, and $R_2$ and $R_3$ each, independently represent hydrogen atoms or straight-chained or branch-chained alkyl groups having 1 to 4 carbon atoms.

2. The white ink according to claim 1, wherein the amount of the amide compound of formula 1 is from 60 percent to 80 percent by mass of the organic solvent.

3. The white ink according to claim 1, further comprising a polysiloxane-based surfactant.

4. The white ink according to claim 1, wherein a content of the polyurethane resin particles is from 1 to 15% by mass of the white ink.

5. The white ink according to claim 4, wherein the polyurethane resin particle is selected from the group consisting of polyether-based polyurethane resin particles, polycarbonate-based polyurethane resin particles, polyester-based polyurethane resin particles mixtures thereof.

6. An ink set comprising:

the white ink according to claim 1; and a non-white ink.

7. The ink set according to claim 6, wherein the non-white ink comprises an organic solvent comprising an amide compound of formula (1):

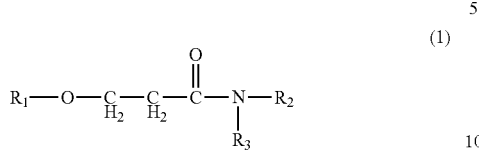

wherein $R_1$ represents a straight-chained or branch-chained alkyl group having one to six carbon atoms, and $R_2$ and $R_3$ each, independently represent hydrogen acorns or straight-chained or branch-chained alkyl group having 1 to 4 carbon atoms.

8. The ink set according to claim 7, wherein an amount of the amide compound of formula 1 is 40 percent by mass or greater of the organic solvent of the non-white ink.

9. The ink set according to claim 8, wherein the amount of the amide compound of formula 1 is from 60 percent to 80 percent by mass of the organic solvent in the non-white ink.

10. The ink set according to claim 6, wherein the non-white ink further comprises a polysiloxane-based surfactant.

11. The ink set according to claim 6, wherein the non-white ink further comprises polyurethane resin particles.

12. The ink set according to claim 11, wherein a glass transition temperature of the polyurethane resin particle is 0 degrees C. or lower.

13. A recording method comprising:
discharging the white ink according to claim 1 and optionally, a non-white ink on a substrate to form an image thereon; and
drying the image.

14. An ink container comprising:
the white ink according to claim 1 and optionally, a non-white ink; and
one or more ink accommodating units configured to include the white ink and optionally, the non-white ink.

15. An inkjet recording device comprising:
the ink container according to claim 14; and
an ink discharging device configured to discharge the white ink and optionally, the non-white ink accommodated in the ink container.

16. The white ink according to claim 1, further comprising a white pigment.

17. The white ink according to claim 16, wherein the white pigment is a metal oxide selected from the group consisting of titanium oxide, iron oxide, tin oxide, zirconium oxide, and iron titanate.

18. The white ink according to claim 16, wherein a whiteness value of the white ink according to ISO-2469 (JIS-8148 format) is 70 or greater.

* * * * *